United States Patent [19]

Harcuba

[11] 4,422,404
[45] Dec. 27, 1983

[54] APPARATUS FOR COATING OF GLASS

[75] Inventor: Siegfried Harcuba, Innsbruck, Austria

[73] Assignee: Glasfabriken-Ausruestergesellschaft m.b.H., Innsbruck, Austria

[21] Appl. No.: 339,946

[22] Filed: Jan. 18, 1982

[30] Foreign Application Priority Data

Jan. 21, 1981 [AT] Austria ............................. A 229/81

[51] Int. Cl.³ ............................................. B05B 1/14
[52] U.S. Cl. .................................. 118/315; 118/323; 118/324; 222/146 C; 222/173; 222/183; 222/485; 222/566
[58] Field of Search ............... 118/300, 315, 323, 324; 222/146 C, 173, 183, 485, 566

[56] References Cited

U.S. PATENT DOCUMENTS

| 2,321,836 | 6/1943 | Marzo | 222/173 X |
| 3,256,581 | 6/1966 | Thal et al. | 118/315 X |
| 4,287,242 | 9/1981 | Monden et al. | 427/421 X |

Primary Examiner—James R. Hoffman
Attorney, Agent, or Firm—Flynn, Thiel, Boutell & Tanis

[57] ABSTRACT

A method and an apparatus for the manufacture of glass coatings by applying metal chlorides which are dissolved in an organic acid, which manufacture and conveying of the coating liquid to the spray nozzles is done excluding contact of the liquid with oxygen. The spray nozzles are mounted on a nozzle bar which is pivotal about an axis extending along its longitudinal length. Each of the nozzles is adjustable to control the spray cone.

20 Claims, 7 Drawing Figures

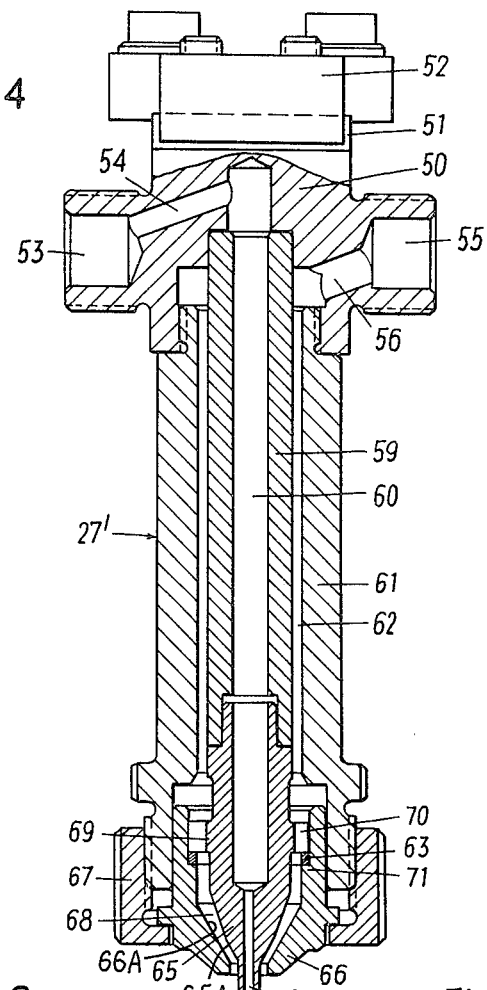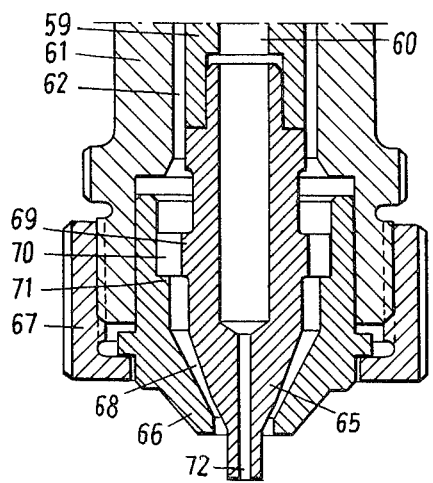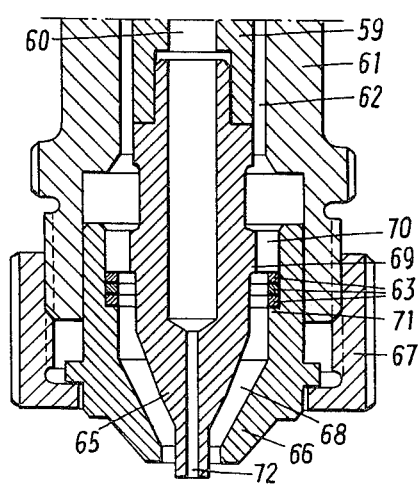

APPARATUS FOR COATING OF GLASS

FIELD OF THE INVENTION

The invention relates to a method and an apparatus for coating of glasses, in particular of flat glass or hollow glass in order to reduce their ultraviolet (UV) or infrared permeability or in order to make same more resistant to chemical influences.

BACKGROUND OF THE IVENTION

It has become known to carry out such coatings of a glass surface, in particular of rolled flat glass, by spraying on a solution of metal chlorides in organic acid with the free presence of atmospheric oxygen. For example, trivalent ferric chloride ($FeCl_3$) is for this purpose dissolved at boiling temperature in pure acetic acid. However, the disadvantage of this known method lies in that due to the contact of atmospheric oxygen with the solution already during its manufacture and before it reaches the nozzle, nascent hydrochloric acid is formed in the lines to the nozzle and in the nozzle, which acid causes corrosion and destruction of the container, the lines and the nozzle. In particular, the nascent hydrochloric acid also causes a change of the color effect, which is to be effected by the solution, through which an evenness in the degree of coloring cannot be assured.

Furthermore the glass surface is exposed to different thermal currents and radiates heat, which, however, during and after the application of the solution is required for the complete oxidation of the organic acid and for the diffusion of the released metal ions, from which in the exchange alkaline ions exit. This too causes unevennesses in the degree of coloring. Due to these disadvantages, it is not possible to employ a method with metal chlorides dissolved in an organic acid to cause a glass to be made unpermeable to ultraviolet (UV) or infrared radiation, without the permeability for the visible light spectrum also being considerably influenced. Also it has not been possible up to now to manufacture a coating which is sufficiently resistant with respect to cleaning by means of alkaline solutions.

Since in the case of conventional devices irregularities in the degree of coloring are caused by the solution not being sufficiently evenly sprayed on, the further basic purpose of the invention is to provide an apparatus in which in a simple manner the spray nozzles are adjustable through which the spraying characteristic can be changed.

The basic purpose of the invention is thus to provide a method and an apparatus through which the listed disadvantages of conventional methods or conventional apparatus are overcome. Thus a method is provided wherein, by using metal chlorides which are dissolved in organic acid, coatings applied to hot glass surfaces are possible without causing a corrosion of the metal parts of the coating device and without causing the glass to have different degrees of coloring.

This is inventively achieved by the manufacture and the conveying of the coating liquid to the coating nozzle without access to oxygen. The containers for receiving the coating liquid are preferably under the pressure of an inert gas. Furthermore the chemicals are preferably moved into the container for the coating liquid through airtight conveying channels.

In an inventive apparatus for carrying out this method, a device is provided for manufacturing the coating liquid under a condition excluding oxygen and from which manufacturing device a coating device can be fed. The coating device can thereby include a bar having a plurality of coating nozzles, which bar is surrounded by a hoodlike shield, and can be rotated about a longitudinally extending axis. Furthermore the nozzles which are arranged in the bar are adjustable to different positions.

According to further preferred characteristics, thermoshields which are constructed with heating devices are provided in the area of the edge of the coating zone and the bar has a liquid-cooled housing, whereby same can be formed by two double-wall parts which are U-shaped in cross section. Finally air nozzles can be provided next to the thermoshields.

The invention will be described in greater detail with reference to the exemplary embodiments of the inventive apparatus, which embodiments are illustrated in the drawings, in which:

FIGS. 4 and 5 illustrate two different views of a partially sectioned slightly modified coating nozzle; and FIGS. 6 and 7 are an enlarged illustration of a detail of FIG. 4.

DETAILED DESCRIPTION

Figure 1:
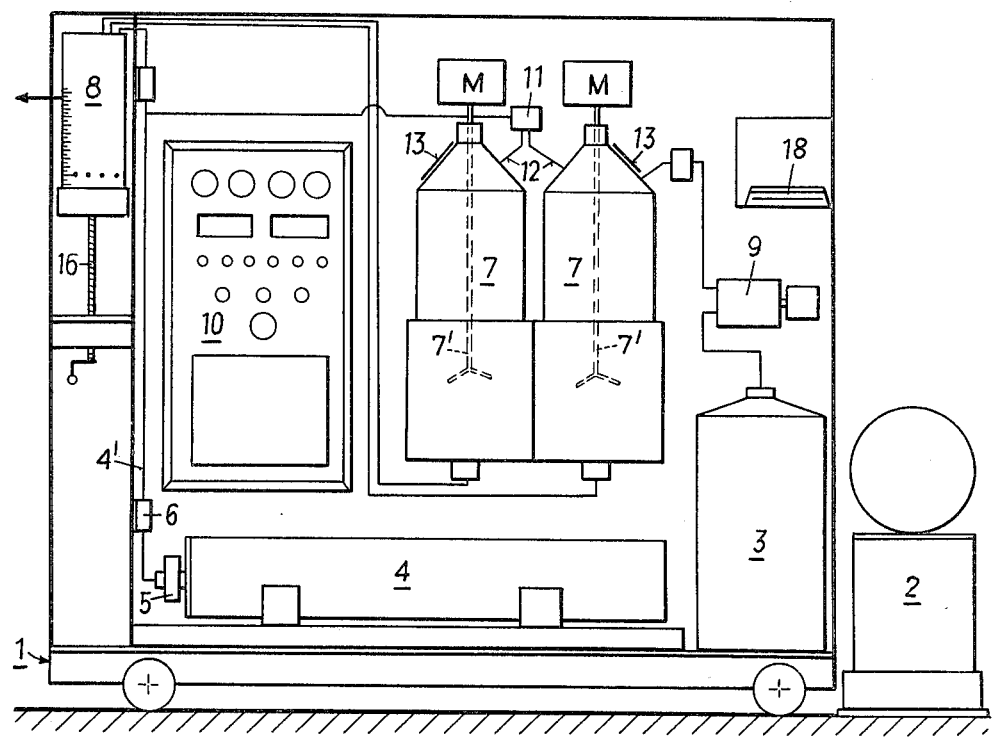
FIG. 1 is a carriage for receiving the devices for feeding a coating nozzle.

FIG. 1 of the drawings illustrates a carriage 1 for receiving the devices for feeding the coating nozzles. This carriage 1 carries an acid container 3, from which acid can be conveyed by means of an acid pump 9 into preparation containers 7. The containers 7 are constructed with motors M for driving agitators 7' which are arranged within the containers 7. The containers 7 are furthermore connected through lines to a levelling container 8 for maintaining a constant head of liquid, from which the liquid is fed to the coating nozzles. The carriage 1 carries furthermore at least one container 4 containing an inert gas, in particular nitrogen, which through lines are connected on the one hand to the containers 7 and on the other hand to the levelling container 8. The carriage 1 furthermore carries a switch box or panel 10 with electrical devices and a scale 18 which is constructed with hoses for weighing chemicals and is thus closed off gastight. Finally a compressor 2 is provided in the system.

Figure 2:
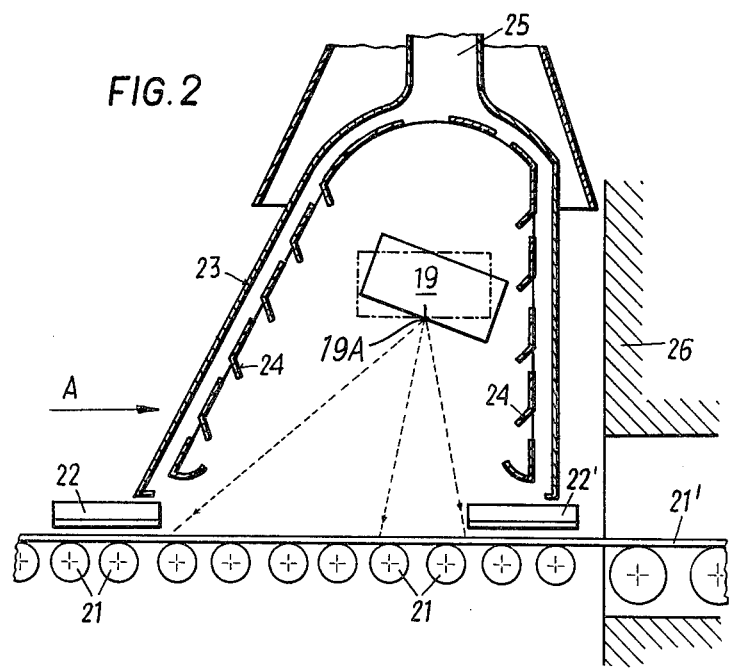
FIG. 2 is a cross-sectional view of a coating device.

FIG. 2 illustrates plural rollers 21 of a conveying mechanism for conveying an elongated glass strip 21', above which is arranged a coating device for the pressurized application of a coating fluid to the glass strip 21'. The coating device consists of a nozzle bar 19 which is pivotal about a longitudinal axis 19a, extending transversely of the direction of movement of the glass strip 21' and which is surrounded by a hood or cover 23 in order to keep out foreign air currents. Sheet-metal baffles or louvers 24 adjacent a plurality of suction openings are provided in the cover 23, which openings are connected through connecting channels to a suction pipe 25 arranged within a further cover. Between the lower edge of the cover 23 and the glass strip 21' there are provided in conveying direction, which is indicated by an arrow A, both on the inlet side and also on the outlet side thermoshields 22, 22'. These thermoshields serve to heat up or to cool off the glass strip, depending on whether we deal with horizontally or with vertically guided glass strips. With this an optimum temperature is achieved which is even over the width of the glass strip, through which the desired evenness in the degree of coloring is influenced.

In the case of coating a vertical glass strip, which is not illustrated in the drawing, for example according to the Fourcault method, a cover is not provided, for which reason the fumes in the forehearth must be guided so as to prevent the dissociated vapors from entering into the drawing tower. This is done in such a manner that an existing smoke duct or stack for removal of fumes at a tipped machine is placed under suction and at the same time, to destroy nonburnt acid fumes, a burner chamber or heat energy of a different type is introduced at approximately 400° C.

Figure 3:
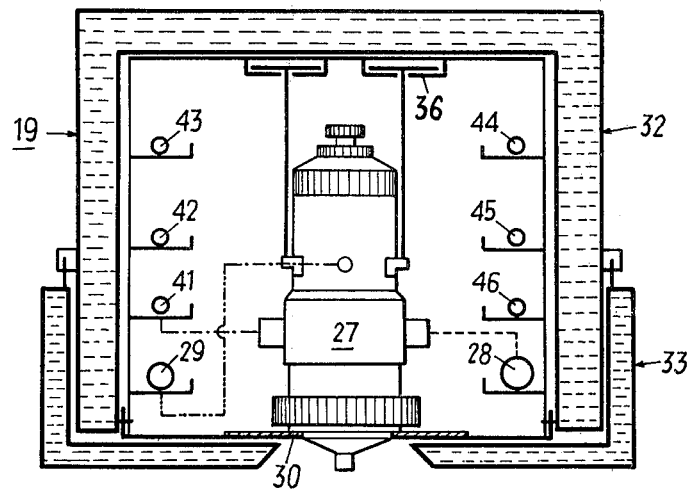
FIG. 3 is a cross-sectional view of a beam utilized for mounting of plural coating nozzles.

FIG. 3 of the drawings more clearly illustrates an exemplary construction of the nozzle bar 19. Same consists of two hollow, U-shaped housing parts 32, 33 facing one another and the legs of which overlap one another. The housing parts are formed by double sleeves and are filled with water. In other words, the housing parts have hollow walls which are filled with water. These housing parts are identified hereinafter as the upper water jacket 32 and the lower water jacket 33. Several nozzles 27 are arranged side by side in a longitudinal direction of the bar 19 within the housing formed by the water jackets 32, 33, the part of which associated with the nozzle opening extends through a recess provided in the lower water jacket 33, wherein the inner space of the housing is covered by a plate 30 which is identified hereinafter as a nozzle shield.

Supply lines 41 to 46 are arranged within the housing and are associated with the individual nozzles 27, whereby the supply line 41 serves to feed the illustrated nozzle 27. These supply lines can also be guided in a clustered manner in an internal pipe, whereby at the end of each line the pipe is constructed with a through-opening for facilitating a connection of the respective line to the respective nozzle. Instead of a plurality of lines, it is also possible to provide one single line, which must be dimensioned so that it is assured that an absolutely identical volume of liquid is fed to each nozzle.

Furthermore a compressed-air line 28 is provided inside of the housing parts 32, 33, through which regulatable compressed air is supplied to the nozzles 27 and with which pressurized air the coating process is performed. Depending on whether the air is pressurized high or low, more or less coating liquid is drawn in.

Finally a control line 29 is provided inside of the housing parts, by means of which the nozzle needles, as soon as the air pressure falls below a certain minimum can be adjusted so that they close tightly in order to prevent a dripping of liquid. If the air pressure is increased beyond the normal degree, the nozzle needles are moved forwardly, which causes any possibly adhering crystallization of the liquid to be removed (self-cleaning).

In order to assure that the coating liquid exits from the individual nozzles 27 at a constant pressure independent of their position within the nozzle bar 19 and thus independent of the distance of the nozzles from the levelling container 8, the liquid lines from the levelling container 8 to the individual nozzles 27 are constructed of equal length or a distributor or manifold is provided after the levelling container 8, from which distributor or manifold extend individual lines to the nozzles 27, which lines are all of equal length.

The devices illustrated in FIGS. 1 to 3 operate as follows:

The preparation containers 7 and the levelling container 8 are filled completely with inert gas, in particular nitrogen, from the container 4 which contains the inert gas, through a line 4', which contains a reducing valve 5 and a two-way valve 6, to prevent, following a feeding of these containers 7, 8 with the coating liquid, an admission of atmospheric oxygen. Since during the entire course of the method a contact of atmospheric oxygen with the coating solution is to be prevented, inert gas is fed through the reducing valve 5 into one of the preparation containers 7 through a two-way valve 11 and through supply lines 12 and also during the removal of coating liquid from the aforesaid one of the preparation containers 7. The reducing valve 5, which can be regulated, is for example adjusted to 100 mb. After this an organic acid, for example acetic acid, is pumped by means of the acid pump 9 from the acid container 3 into one of the two preparation containers 7, which acid is heated to approximately 50° C. to 60° C. in the container 7. Furthermore chemicals are introduced into the respective container 7 through a gastight charging opening 13, which chemicals are chosen depending on which coating is to be applied. For example to achieve a gold-shinelike color reaction on the glass, trivalent ferric chloride and tin chloride is utilized. To measure the amounts for this the gastight scale 18 is used. Due to an exothermic chemical reaction, a temperature increase to approximately 80° to 85° C. occurs. The temperature in the containers 7 can furthermore be controlled by means of the associated heating devices. In addition a mechanical mixing of the parts of the coating liquid occurs by means of the agitating devices 7' which are arranged in the containers 7. After this the coating liquid, in particular under the action of the inert gas pressure, is fed to the levelling container 8, to which the supply lines 41 to 46 of the individual nozzles 27 are connected. In order to cause in a simple manner a pressure regulation and a regulation of the amount at the nozzles 27, the levelling container 8 is constructed adjustably in height by means of a spindle 16.

The electrical devices which are combined in the switch box 10 serve to control the coating system. A monitor which is also provided in the switch box can be utilized to monitor the coating quality on the glass strip 21'. Collecting trays, which are not illustrated in the drawings, are furthermore preferably provided and are connected through lines to the preparation containers 7 and which for safety purposes are used to collect the coating liquid contained in the containers 7 or for collecting the liquids which serve to clean the containers 7. The two-way valves which are illustrated in the drawings are used to switch over the feeding of one of the two containers 7, to remove the coating liquid from one of the two containers 7 or to feed the containers 7 with inert gas from one of several bottles 4 which contain inert gas. Finally the front of the preparation device is equipped with a removable heat shield adjacent the glass coating area, which heat shield is also not illustrated in the drawings.

The device which is illustrated in FIG. 2 serves to coat the glass strip 21' with the liquid. By feeding the nozzles 27 of the nozzle bar 19 with the liquid, the glass strip 21' is coated in a number of coating cones, which number corresponds with the number of the coating nozzles 27. The position of the cones can be adjusted by a pivoting of the nozzle bar 19 about an axis which extends lengthwise of the bar. The nozzle bar 19 can also be adjusted in height, namely at a distance from the surface of the glass, to for example increase or reduce the coating area of each nozzle. The density of the coating can be changed furthermore by increasing the pressure of the liquid or of the compressed air which is supplied to the nozzles.

The glass strip 21' which enters into the coating device has a temperature of approximately 580° C. to 680° C. The fumes which are created during the coating process are discharged past the sheet-metal guides 24 into the cover 23 and through the suction pipe 25. In order to increase the supply of atmospheric oxygen, air pipes with flat nozzles are arranged on the inside ends of the thermoshields 22, 22', through which hot air can be supplied to the surface of the glass strip 21'. The air nozzles can be fed through the compressor 2 or through other aero-dynamic devices which are common in glassworks. To minimize the heating expenses which are created hereby, the excess heat which is created by the glass production can be utilized here.

In order to reach the temperature which is necessary for the chemical reaction during the coating process or to maintain said temperature over the glass surface, ceramically mounted electro-radiators are provided furthermore in the thermoshields 22, 22', which electroradiators are controlled corresponding with the thermal requirements. In the case of free glass strips, as they exist in the vertical drawing method, thermoshields can also be arranged on the other side, which shields in addition can be used to cool off the glass strip to prevent that same tears off. The thermoshield 22' which is the second one in the conveying direction is used preferably to increase the temperature of the glass strip 21, which has been cooled off through the application of the coating liquid, to such a temperature value, which is necessary for the starting of ion exchange or for the diffusion of the metals. Following the coating procedure, the glass strip 21' travels into a device 26 for the glass annealing. A vertical glass strip is introduced into the drawing tower of the glassdrawing machine.

As can be seen from FIG. 3 of the drawings, the nozzle bar 19 is constructed with a water-cooled housing 32, 33, which causes the devices which are arranged on its inside to be thermally insulated with respect to the radiation from the glass strip 21'. To adjust the individual nozzles 27 within the nozzle bar 19, same can be lifted against the action of a spring, through which the nozzle shield is pressed against the edge of the through-opening of the lower water jacket 33, and can be moved along a guide mechanism 36 which is provided on the inner upper side of the nozzle bar.

As this has already been discussed above, the coating liquid is supplied to the individual nozzles 27 through one of the lines 41 to 46, which coating liquid is ejected from the nozzles under the influence of the compressed air which is supplied through the line 28 at a suitable pressure of between approximately 1.5 to 4.5 bar. The form of the coating cone of the nozzles can be adjusted through an additional adjusting screw. For example in order to coat bottles, a conventional gripping and turning device for the delivery belt of the bottle automat is necessary. The nozzle arm is arranged opposite same, which arm is positioned vertically and has preferably only one nozzle or two nozzles. Depending on the local conditions, care must then be taken that the dissociation vapors are discharged through a suction pipe.

Figure 5:
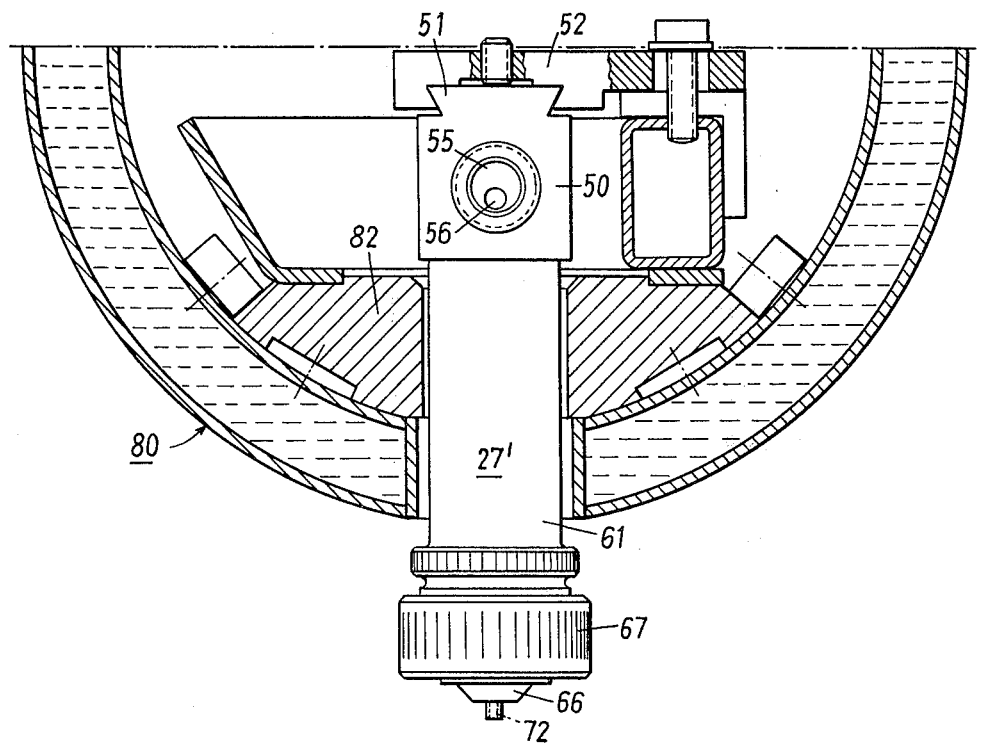

FIGS. 4 and 5 of the drawings illustrate a further exemplary embodiment of a coating nozzle 27'. This coating nozzle consists of a support member 50 which at its end which is the upper end in the drawings is constructed as a bar 51 trapezoidal in cross section, which bar is guided in a groove of a holding beam 52, which groove conforms in cross section to that of the bar, and is movable relative to same. The holding beam 52 is rotatable or pivotal about a longitudinal axis. The side surfaces of the bar 51 function as guide surfaces. On the side of the support member 50 remote from the bar 51 are provided an inner pipe 59 and an outer pipe 61 spaced radially therefrom. The interior of the pipes defines concentric bores which are different in diameter. The support member 50 furthermore is constructed with a lateral connecting bore 53, which through a connecting channel 54 is connected to the inside 60 of the pipe 59. Furthermore the support member 50 is constructed on the side which is opposite the bore 53 with a second bore 55, which through a channel 56 is connected to the annulus or space 62 which is formed between the pipes 59 and 61. This is a conventional design of such nozzles.

A nozzle mouthpiece 65 is provided at the free end of the inner pipe 59 with the interpositioning of a spacer, which nozzle mouthpiece 65 is surrounded by a sleeve 66, which is carried by means of a clamping nut 67 by the outer pipe 61. As evident from FIG. 4, the mouthpiece 65 of the inner pipe 59 has an exterior surface 65A which converges conically toward the lower or discharge end thereof. The lower end of the mouthpiece 65 has therethrough a central bore 72 which serves as a discharge opening for the inner pipe 59. The sleeve 66 has a conical inner surface 66A which faces the conical exterior surface 65A on the mouthpiece 65, axial movement of the sleeve 66 varying the distance between the conical surfaces 65A and 66A. At least one spacer 63 is arranged between an annular shoulder 71, which is provided inside of the sleeve 66, and an annular rib 69 which projects from the nozzle mouthpiece 65 and which is constructed with helical grooves 70. The number of spacers 63 determines the size of the annular clearance 68 which is formed between the nozzle mouthpiece 65 and the sleeve 66 and thus the form of the spray cone of the medium which exits from said annular clearance. The helical grooves 70 guide the air jet over a predetermined length. The amount of air which passes through the helical grooves or the air pressure is not influenced by the at least one spacer 63.

The two pipes 59 and 61 extend through a housing 80 (FIG. 5), which is constructed with double walls and is filled with a cooling fluid and which is constructed with one separate bore for each nozzle 27'. A block 82 of a good heat-conducting material is connected to the inner wall of the housing 80, which block serves as a cooling shoe. The individual parts of the nozzle 27' are manufactured of nickel, steel, plastic or tantalum. Since the chemical and mechanical resistance of the nozzle mouthpiece 65 is of a decisive importance, same is preferably manufactured of tantalum or niobium.

This device operates as follows:

A plurality of such spray nozzles 27' is mounted adjustably and securably by means of the bar 51 in the support beam 52. Since the spray nozzles are adjustable in the support beam 52, their reciprocal distance can be adjusted. Air or a different gas which causes the spraying is supplied through flexible lines (not illustrated) to the connecting bore 55. Also the solution to be sprayed out is supplied to the connecting bore 53 through not illustrated flexible lines. The solution transfers from the bore 53 through the channel 54 into the interior 60 of the inner pipe 59 and moves from same into the nozzle mouthpiece 65 and through the central bore 72. The spray gas which is fed to the connecting bore 55 transfers through the channel 56 into the annulus 62 which is formed between the pipes 59 and 61 and moves through the helical grooves 70, which are provided in the rib 69, into the annulus 68 which is formed between the nozzle mouthpiece 65 and the sleeve 66, from which annulus 68 it exits. The spray cone of the solution is determined by the characteristic of the air which exits from the annulus 68. This characteristic is—as mentioned—influenced by the number of spacers 63. The liquid-cooled housing 80 serves to shield the mounting of the nozzle and of the supply lines against the hat which is radiated by the hot glass strip, the surface of which is to be coated.

Since the holding beam 52 and with same the nozzles are pivotal, since furthermore the characteristic of the spray cone of the individual nozzles can be adjusted and since in addition the individual nozzles are adjustable in their reciprocal distance, the solution can be sprayed on with the necessary evenness in order to achieve the desired evenness in the coating.

FIGS. 6 and 7 illustrate such a spray nozzle 27' in an enlarged scale. A spacer is thereby according to FIG. 6 not arranged between the nozzle mouthpiece 65 and the sleeve 66, however, according to FIG. 7 three spacers 63 are arranged, which causes the annular clearance 68 to be substantially changed.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus for applying to a glass object a coating of metal chlorides which are dissolved in an organic acid, comprising a hood having an opening therein, said glass object being disposed in the region of said opening, at least one thermoshield supported in the region of said opening in said hood and having means for heating said glass object, a nozzle bar movably supported within said hood, a plurality of nozzles supported on said nozzle bar, first means for dissolving said metal chlorides in said organic acid in an environment free of oxygen to produce a coating fluid, and second means for supplying said coating fluid to said nozzles on said nozzle bar free of exposure to oxygen, said coating fluid being sprayed onto said glass object by said nozzles.

2. The apparatus according to claim 1, wherein said nozzle bar is supported for pivotal movement about an axis.

3. The apparatus according to claim 1, wherein said nozzles supported on said nozzle bar are adjustable to different positions relative to one another and relative to said nozzle bar.

4. The apparatus according to claim 3, wherein said nozzles are supported by dovetail mountings on said nozzle bar and are positionally adjustable thereon.

5. The apparatus according to claim 1, wherein said nozzle bar includes a housing around said nozzles and includes means for cooling said housing with a liquid.

6. The apparatus according to claim 1, including air nozzles supported next to said thermoshields.

7. The apparatus according to claim 1, wherein each said nozzle has means defining two concentric channels which respectively carry said coating fluid and a gaseous medium, and has means for changing the cross section of said channel for said gaseous medium in order to adjust the spray characteristics of the nozzle.

8. The apparatus according to claim 7, wherein said concentric channels of each said nozzle include a center inner channel which carries said coating fluid and an annular channel concentrically surrounding said inner channel which carries said gaseous medium, and wherein said means defining said concentric channels includes a pipe having a conical outer surface and includes a sleeve which surrounds said conical surface on said pipe and is supported for axial movement relative thereto, the region between said pipe and said sleeve being a portion of said annular channel.

9. The apparatus according to claim 8, wherein the portion of said inner pipe of said nozzle having said conical surface thereon is made of tantalum or niobium.

10. The apparatus according to claim 9, wherein said inner pipe has a radially outwardly extending rib thereon which is disposed in said annular channel and has helical grooves therein.

11. An apparatus for applying to a glass object a coating of metal chlorides which are dissolved in an organic acid, comprising a nozzle supported in the vicinity of the glass object, first means for dissolving said metal chlorides in said organic acid in an environment free of oxygen to produce a coating fluid, and second means for supplying said coating fluid to said nozzle free of exposure to oxygen, said coating fluid being sprayed onto said object by said nozzle.

12. The apparatus according to claim 11, wherein said first means includes an airtight leveling container and an airtight preparation container, means for adjusting the vertical position of said leveling container, means for introducing said metal chlorides into said preparation container, means for supplying an inert gas to said leveling container and to said preparation container, means for supplying an organic acid to said preparation container, means for agitating said metal chlorides and said organic acid in said preparation container to produce said coating fluid, and means for transferring said coating fluid from said preparation container to said leveling container, said second means communicating with said leveling container and supplying said coating fluid from said leveling container to said nozzle.

13. The apparatus according to claim 11, including a hood having an opening therein, said glass object being disposed in the region of said opening; at least one thermoshield supported adjacent said glass object in the region of said opening in said hood and having one of third means for heating said glass object and fourth means for cooling said glass object; a nozzle bar movably supported within said hood; and a plurality of nozzles supported on said nozzle bar, said first-mentioned nozzle being one of said plurality of nozzles.

14. The apparatus according to claim 13, wherein said glass object is an elongate glass plate; including means supporting said glass plate adjacent and for movement past said opening in said hood; wherein said nozzle bar is supported for pivotal movement about an axis which extends approximately parallel to said glass plate and transversely of the direction of movement thereof; and including two said thermoshields supported on said hood adjacent and on opposite sides of said opening at locations spaced in the direction of movement of said glass plate, said thermoshields respectively regulating the temperature of regions of said glass plate immediately before and immediately after each such region passes said opening in said hood.

15. The apparatus according to claim 14, wherein said hood includes a plurality of suction openings in an inner surface thereof, a plurality of louvers which are each provided on said inner surface of said hood adjacent a respective said suction opening, and at least one connecting channel which provides communication between said suction openings and a source of suction, and including an annealing device, said glass plate passing through said annealing device after passing said opening in said hood.

16. The apparatus according to claim 14, wherein said nozzles are each positionally adjustable relative to said nozzle bar and relative to each other in a direction substantially parallel to said pivot axis of said nozzle bar.

17. The apparatus according to claim 14, wherein said second means includes a leveling container which contains a quantity of said coating fluid and a respective supply line connecting said leveling container to each said nozzle, all of said supply lines being of substantially identical length.

18. The apparatus according to claim 13, wherein said nozzle bar includes a housing having hollow walls which are filled with a fluid, each said nozzle being substantially disposed within said housing, a discharge end of each said nozzle being aligned with an opening provided through a wall of said housing.

19. The apparatus according to claim 18, including a block of heat-conducting material within said housing which engages a wall of said housing and at least one said nozzle.

20. The apparatus according to claim 13, wherein each said nozzle includes an inner pipe which carries said coating fluid to a discharge opening at one end thereof and has an exterior surface in the region of said discharge opening which converges approximately conically toward said discharge opening, and including a sleeve of greater diameter than said inner pipe which coaxially surrounds said inner pipe in the region of said conical surface thereon, thereby defining an annular space between said sleeve and said inner pipe, including means for supplying a compressed gas to said annular space, said sleeve being supported for axial movement relative to said inner pipe and having an approximately conical interior surface which faces said conical exterior surface on said inner pipe.

* * * * *